(12) United States Patent
Matsumoto et al.

(10) Patent No.: US 11,075,560 B2
(45) Date of Patent: Jul. 27, 2021

(54) STATOR OF ROTARY ELECTRIC MACHINE AND METHOD OF MANUFACTURING STATOR COIL

(71) Applicant: Toyota Jidosha Kabushiki Kaisha, Toyota (JP)

(72) Inventors: Masashi Matsumoto, Nagoya (JP); Shingo Nagai, Toyota (JP); Yoshitomo Kawanishi, Nagoya (JP); Keiji Takizawa, Toyota (JP); Keiichi Kaneshige, Seto (JP); Masahiro Nishimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 16/243,384

(22) Filed: Jan. 9, 2019

(65) Prior Publication Data

US 2019/0222087 A1 Jul. 18, 2019

(30) Foreign Application Priority Data

Jan. 15, 2018 (JP) .............................. JP2018-004509

(51) Int. Cl.
*H02K 3/50* (2006.01)
*H02K 3/12* (2006.01)
(Continued)

(52) U.S. Cl.
CPC ................ *H02K 3/50* (2013.01); *H02K 1/16* (2013.01); *H02K 3/12* (2013.01); *H02K 3/38* (2013.01); *H02K 3/48* (2013.01); *H02K 15/0081* (2013.01); *H02K 15/024* (2013.01); *H02K 15/0421* (2013.01); *H02K 15/064* (2013.01); *H02K 15/105* (2013.01)

(58) Field of Classification Search
CPC .......... H02K 3/50; H02K 3/48; H02K 15/064; H02K 15/024; H02K 15/0421; H02K 1/16; H02K 3/38; H02K 15/105; H02K 3/12; H02K 15/0081; H02K 3/28; H02K 3/04; H02K 15/085
USPC ............................. 310/71, 179–210; 29/596
See application file for complete search history.

(56) References Cited

U.S. PATENT DOCUMENTS 3,185,872 A   5/1965  Weissheimer et al.
3,978,359 A   8/1976  Kultzow et al.
(Continued)

FOREIGN PATENT DOCUMENTS

CN        2935508 Y    8/2007
CN      105322671 A    2/2016
(Continued)

*Primary Examiner* — Ahmed Elnakib
(74) *Attorney, Agent, or Firm* — Dinsmore & Shohl LLP

(57) ABSTRACT

A stator of a rotary electric machine comprises a stator core and a stator coil that is wound around the stator core. The stator coil includes a first segment coil, a second segment coil, and a first connecting member that has a first fitting recess portion at a first end of the first connecting member and a second fitting recess portion at a second end of the first connecting member, the first connecting member connecting the first segment coil and the second segment coil by fitting the first segment coil into the first fitting recess portion and by fitting the second segment coil into the second fitting recess portion.

14 Claims, 10 Drawing Sheets

(51) Int. Cl.
*H02K 15/00* (2006.01)
*H02K 3/48* (2006.01)
*H02K 15/06* (2006.01)
*H02K 15/02* (2006.01)
*H02K 15/04* (2006.01)
*H02K 1/16* (2006.01)
*H02K 3/38* (2006.01)
*H02K 15/10* (2006.01)

(56) References Cited

U.S. PATENT DOCUMENTS

| | | | | |
|---|---|---|---|---|
| 4,770,641 A | * | 9/1988 | Rowlette | H05K 3/368 |
| | | | | 439/86 |
| 5,514,836 A | * | 5/1996 | Delalle | H01R 4/22 |
| | | | | 174/74 R |
| 6,476,530 B1 | * | 11/2002 | Nakamura | H02K 3/12 |
| | | | | 310/201 |
| 2002/0043886 A1 | * | 4/2002 | Fujita | H02K 15/0478 |
| | | | | 310/201 |
| 2003/0164656 A1 | * | 9/2003 | Sakurai | H02K 3/12 |
| | | | | 310/201 |
| 2016/0087502 A1 | * | 3/2016 | Rumbaugh | H02K 5/132 |
| | | | | 310/71 |
| 2016/0172919 A1 | * | 6/2016 | Hattori | H02K 15/02 |
| | | | | 310/208 |
| 2016/0276887 A1 | | 9/2016 | Watanabe et al. | |
| 2017/0040859 A1 | * | 2/2017 | Langlard | H02K 15/0068 |
| 2019/0222087 A1 | * | 7/2019 | Matsumoto | H02K 15/064 |
| 2020/0044495 A1 | * | 2/2020 | Hattori | H02K 3/02 |
| 2020/0169151 A1 | * | 5/2020 | Hashimoto | H02K 15/04 |
| 2020/0169152 A1 | * | 5/2020 | Matsumoto | H02K 15/0081 |
| 2020/0204028 A1 | * | 6/2020 | Mizushima | H02K 15/064 |

FOREIGN PATENT DOCUMENTS

| | | | |
|---|---|---|---|
| DE | 102015225585 A1 | | 6/2017 |
| EP | 2621062 A1 | | 7/2013 |
| JP | S50095702 A | | 7/1975 |
| JP | 2006-141076 A | | 6/2006 |
| JP | 2009194999 A | | 8/2009 |
| JP | 2013208038 | * | 10/2013 |
| JP | 2015-023771 A | | 2/2015 |
| JP | 2016-178783 A | | 10/2016 |
| JP | 2016187245 | * | 10/2016 |
| WO | 2015/011542 A2 | | 1/2015 |

* cited by examiner

STATOR CIRCUMFERENTIAL DIRECTION

STATOR CIRCUMFERENTIAL DIRECTION

STATOR OF ROTARY ELECTRIC MACHINE AND METHOD OF MANUFACTURING STATOR COIL

CROSS-REFERENCE TO RELATED APPLICATIONS

This application claims priority to Japanese Patent Application No. 2018-004509 filed on Jan. 15 2018, which is incorporated herein by reference in its entirety including the specification, drawings and abstract.

BACKGROUND

1. Technical Field

The present disclosure relates to a stator of a rotary electric machine, which includes a stator core and a stator coil that is wound around the stator core, and a method of manufacturing a stator coil.

2. Description of Related Art

A stator of a rotary electric machine is generally configured by winding a stator coil around a stator core. As the stator coil, a stator coil that is formed by connecting a plurality of segment coils is known. When manufacturing such a stator coil, for example, a substantially U-shaped segment coil is inserted into a slot of a stator core, and a portion of the segment coil, which protrudes from the end face of the stator core in an axial direction of the stator core, is tilted and bent in a circumferential direction. Then, an end portion of the bent segment coil is welded and joined to an end portion of another segment coil bent likewise.

SUMMARY

However, in such a technique, after the segment coil is assembled to the stator core, bending or welding of the segment coil, insulation treatment of a welded portion, and the like are needed, and thus a manufacturing process is complicated.

Therefore, in some of the related arts, a technique of bending a segment coil in advance and then assembling it to a stator core is disclosed. For example, Japanese Unexamined Patent Application Publication No. 2009-194999 (JP 2009-194999 A) discloses a technique of manufacturing a stator coil by preparing first and second coils formed in a desired shape in advance, bringing the tip of the first coil and the tip of the second coil into contact with each other and joining them together, thereby fabricating a multiphase circumferentially developing coil having a distributed winding structure, and sequentially inserting the circumferentially developing coils into slots of a stator core.

According to such a technique, after the segment coil is inserted into the slot, treatment such as bending or joining (welding) of the segment coil is not needed, and therefore, a manufacturing process can be simplified to some extent.

However, in JP 2009-194999 A, a joining method such as pressure welding or ultrasonic joining is adopted in order to directly join the tip of the first coil and the tip of the second coil together. However, such a joining method requires large-sized equipment and complicates the manufacturing process.

Therefore, the present disclosure provides a stator of a rotary electric machine and a method of manufacturing a stator coil, in which a manufacturing process can be further simplified.

A first aspect of the disclosure relates to a stator of a rotary electric machine. The stator includes a stator core and a stator coil that is wound around the stator core. The stator coil includes a first segment coil, a second segment coil, and a first connecting member. The first connecting member has a first fitting recess portion at a first end of the first connecting member and a second fitting recess portion at a second end of the first connecting member. The first connecting member connects the first segment coil and the second segment coil by fitting the first segment coil into the first fitting recess portion and by fitting the second segment coil into the second fitting recess portion.

According to the first aspect of the disclosure, the first and second segment coils can be connected solely by press-fitting the first segment coil into the first fitting recess portion and by press-fitting the second segment coil into the second fitting recess portion. In other words, in the connection of the segment coils, treatment such as welding or pressure welding is not needed. As a result, large-sized equipment is not needed and a manufacturing process can be further simplified.

In the stator according to the first aspect of the disclosure, the first connecting member may include a main body that is made of a conductive material and to which the first and second segment coils are fitted, and an insulating film covering an outer surface of the main body. The main body may configure a part of a current path of the stator coil.

According to the aspect of the disclosure, since the first and second segment coils may be spaced apart from each other, an error in the axial dimension of the segment coil can be absorbed by the first connecting member. As a result, the manufacturing process of the segment coil can be simplified.

In the stator according to the first aspect of the disclosure, the first connecting member may include a tubular main body that is made of an insulating material and to which the first and second segment coils are fitted. The first and second segment coils are electrically connected to each other by being in contact with each other inside the main body or through an electric conductor accommodated in the main body.

According to the aspect of the disclosure, the range of selection of the material of the main body of the connecting member is expanded.

In the stator according to the aspect of the disclosure, the first and second segment coils may be electrically connected to each other by an electric conductor inside the main body. The electric conductor may have elasticity or fluidity and the electric conductor may flexible in an axial direction of the electric conductor.

According to the aspect of the disclosure, an error in the axial dimension of the segment coil can be absorbed by the electric conductor. As a result, the manufacturing process of the segment coil can be simplified.

In the stator according to the first aspect of the disclosure, the first segment coil may have a first peeled portion where a first coil film is peeled off at an end portion of the first segment coil. The second segment coil may have a second peeled portion where a second coil film is peeled off at an end portion of the second segment coil. At least a part of the first peeled portion may be accommodated in the first fitting recess portion, and at least a part of the second peeled portion may be accommodated in the second fitting recess portion.

According to the aspect of the disclosure, after the first and second segment coils are connected by the first connecting member, insulation treatment of the peeled portion is not needed, and thus the manufacturing process can be further simplified.

In the stator according to the first aspect of the disclosure, at least one of an end portion of the first segment coil and the first fitting recess portion may be provided with a taper for guiding the other of the end portion of the first segment coil and the first fitting recess portion, and at least one of an end portion of the second segment coil and the second fitting recess portion may be provided with a taper for guiding the other of the end portion of the second segment coil and the second fitting recess portion.

According to the aspect of the disclosure, the first and second segment coils and the first connecting member can be more easily fitted to each other, and thus the manufacturing process can be further simplified.

In the stator according to the first aspect of the disclosure, the first connecting member and a second connecting member aligned adjacent to the first connecting member in a radial direction of the first segment coil may be offset from each other in an axial direction of the first segment coil.

According to the aspect of the disclosure, insulation between the coils can be secured reliably. That is, when there is a gap between the end portion of the first connecting member and the end portion of the coil film, the conducting wire is exposed in the gap. However, with the above configuration, a distance between the exposed portion of the coil and an exposed portion of the other coil aligned adjacent to the coil is increased, and thus insulation is secured.

In the stator according to the first aspect of the disclosure, the first segment coil and the second segment coil may have cross-sectional shapes different from each other.

According to the aspect of the disclosure, since a cross-sectional shape according to the characteristic needed (for example, improvement in space factor, improvement in bendability, or the like) to each segment coil can be adopted, the performance or quality of the stator can be further improved.

In the stator according to the first aspect of the disclosure, the first and second fitting recess portions of the first connecting member have shapes different from each other.

In the stator according to the first aspect of the disclosure, the first segment coil may have a vertical line portion that is accommodated in a slot of the stator core is fitted into the first fitting recess portion of the first connecting member. The second segment coil may be provided outside the stator core in an axial direction of the stator core, extend in a circumferential direction of the stator core, and configures a coil end is fitted into the second fitting recess portion of the first connecting member. The first segment coil and the second segment coil may be connected by the first connecting member in a vicinity of an end portion of the slot in an axial direction of the slot.

According to the aspect of the disclosure, with a configuration in which the first and second segment coils are connected in the vicinity of the end portion of the slot in the axial direction of the slot, the end portion of the first segment coil can be easily accessed even after the first segment coil is assembled to the core. As a result, the work of connecting the segment coils can be easily performed.

A second aspect of the disclosure relates to a method of manufacturing a stator coil that is wound around a stator core. The method includes preparing a first segment coil, a second segment coil, and a connecting member having a first fitting recess portion at a first end of the connecting member and a second fitting recess portion at a second end of the connecting member to form the stator coil, and connecting the first segment coil and the second segment coil by fitting the first segment coil into the first fitting recess portion and by fitting the second segment coil into the second fitting recess portion.

According to the second aspect of the disclosure, the segment coils can be connected solely by fitting the first segment coil into the first fitting recess portion and by fitting the second segment coil into the second fitting recess portion. In other words, when connecting the first and second segment coils, treatment such as welding or pressure welding is not needed. As a result, large-sized equipment is not needed, and the manufacturing process can be further simplified.

In the method according to the second aspect of the disclosure, an outer peripheral surface of the first connecting member may be subjected to insulation treatment before connecting the first and second segment coils.

According to the aspect of the disclosure, after the first and second segment coils are connected, insulation treatment of a peeled portion of the segment coil is not needed, and thus the manufacturing process of the stator coil can be further simplified.

In the method according to the second aspect of the disclosure, after the first segment coil formed in a final shape is assembled to the stator core, the second segment coil formed in a final shape may be connected to the first segment coil through the first connecting member.

According to the aspect of the disclosure, the first segment coil is formed in the final shape before assembling to the stator core, whereby it is possible to remove a bending step after the core assembling, and thus the manufacturing process of the stator coil can be further simplified.

In the method according to the aspect of the disclosure, the first segment coil may have a vertical line portion that is accommodated in a slot of the stator core. The second segment coil may be provided outside the stator core in an axial direction of the stator core, extend in a circumferential direction of the stator core, and forms a coil end. After a plurality of first segment coils is assembled to the stator core, a plurality of second segment coils integrated with resin may be connected to the plurality of the first segment coils through a plurality of the connecting members at once.

According to the aspect of the disclosure, since the second segment coils can be connected at once, the manufacturing process can be further simplified.

In the method according to the aspect of the disclosure, the first segment coil may be fitted to the connecting member after the first segment coil is assembled to the stator core.

In a case where the first segment coil is fitted to the connecting member before the first segment coil is assembled to the stator core, the first segment coil is locally thickened due to an axial compression force that is generated at the time of the fitting, and thus a space factor decreases. However, according to the aspect of the disclosure, the fitting of the first segment coil and the connecting member is performed after the first segment coil is assembled to the stator core, whereby such a problem can be suppressed.

According to the aspects of the disclosure, the segment coils can be connected solely by press-fitting the end portions of the segment coils into the fitting recess portions respectively. In other words, when connecting the first and second segment coils, treatment such as welding or pressure welding is not needed. As a result, large-sized equipment is not needed, and the manufacturing process can be further simplified.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
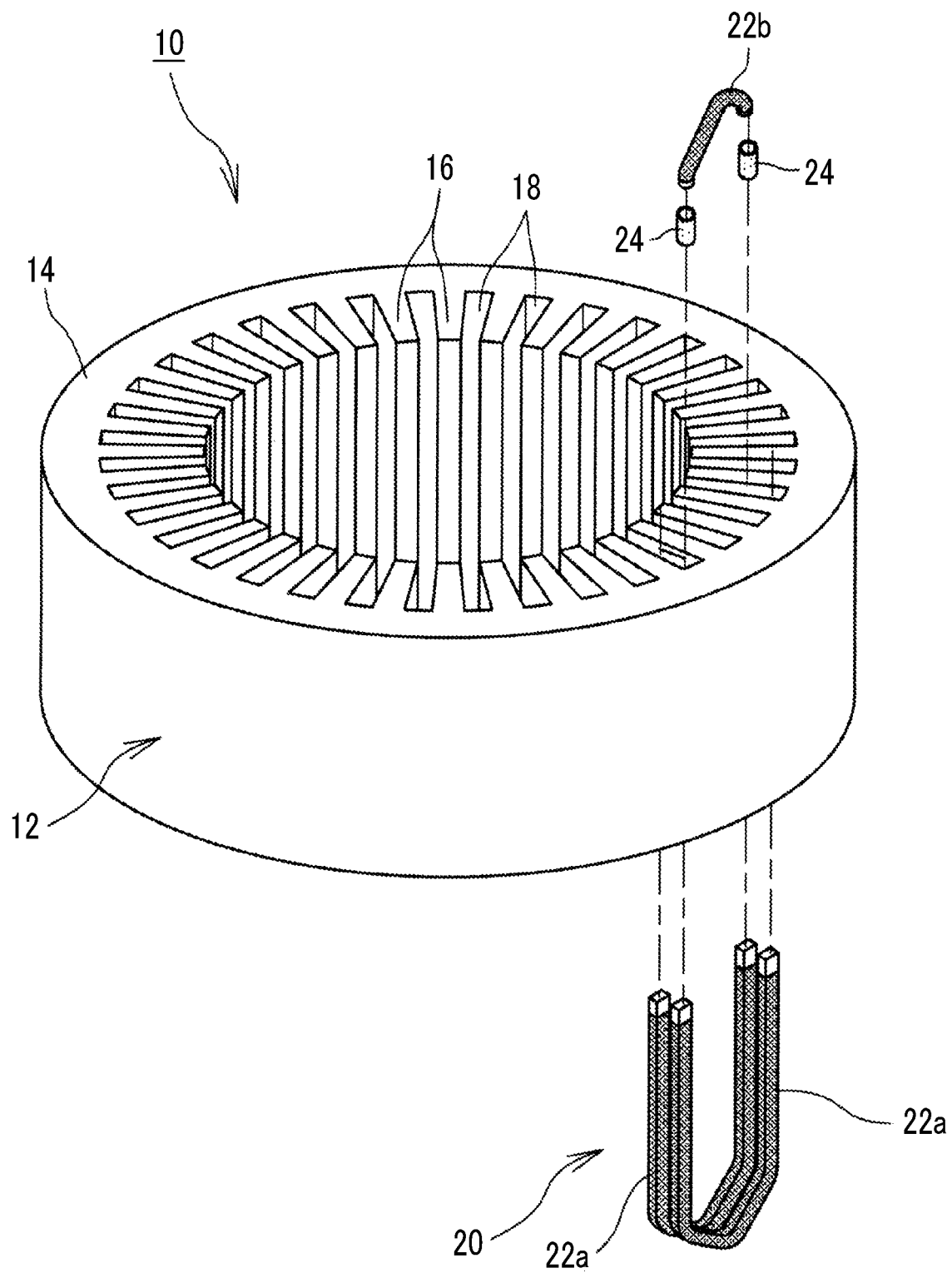
FIG. 1 is an exploded perspective view of a stator.

Hereinafter, a stator 10 of a rotary electric machine will be described with reference to the drawings. FIG. 1 is an exploded perspective view of the stator 10 of a rotary electric machine. The actual stator 10 has a large number of segment coils 22. However, in FIG. 1, for the sake of viewability, solely a few segment coils 22 are shown.

The stator 10 is combined with a rotor to configure a rotary electric machine. The rotary electric machine to which the stator 10 is applied may be a rotary electric machine that is used as an electric motor or may be a rotary electric machine that is used as a generator. Therefore, the stator 10 of this example may be applied to a rotary electric machine that is, for example, a rotary electric machine that is mounted on an electrified vehicle, and operates as an electric motor that generates power for traveling and also operates as a generator that generates electric power with regenerative torque or the like.

The stator 10 has a stator core 12 and a stator coil 20 that is wound around the stator core 12. The stator core 12 is divided roughly into an annular core back 14 (in this specification, the expression "annular" also includes the meaning of "substantially annular") and a plurality of teeth 16 protruding radially inward from the inner peripheral surface of the core back 14. A slot 18 that is a space in which a part of the stator coil 20 is accommodated is formed between the teeth 16 adjacent to each other in a circumferential direction of the core back 14. The stator core 12 may be, for example, a laminated steel sheet that is made by laminating a plurality of electromagnetic steel sheets (for example, silicon steel sheets) in a thickness direction of the stator core 12. The stator core 12 may be a dust core that is made by press-forming magnetic particles coated to be insulated.

The stator coil 20 is wound around the teeth 16 of the stator core 12. A connection mode and a winding mode of the stator coil 20 may be appropriately selected according to the specifications of the rotary electric machine. Therefore, the stator coil 20 may have a configuration in which U-phase, V-phase, and W-phase coils are star-connected or delta-connected. The stator coil 20 may be wound in distributed winding or may be wound in concentrated winding. In any case, in this example, the stator coil 20 is configured by connecting a plurality of segment coils 22.

The segment coil 22 is obtained by cutting the stator coil 20 to a length that is easy to handle. In this example, the segment coil 22 includes a U-shaped (in this specification, the expression "U-shaped" also includes the meaning of "substantially U-shaped") first segment coil 22a and a chevron-shaped (in this specification, the expression "chevron-shaped" also includes the meaning of "substantially chevron-shaped") second segment coil 22b. In the following, in a case where it is not distinguished between the first segment coil and the second segment coil, it is called a "segment coil 22" with the suffix alphabet omitted.

Figure 2:
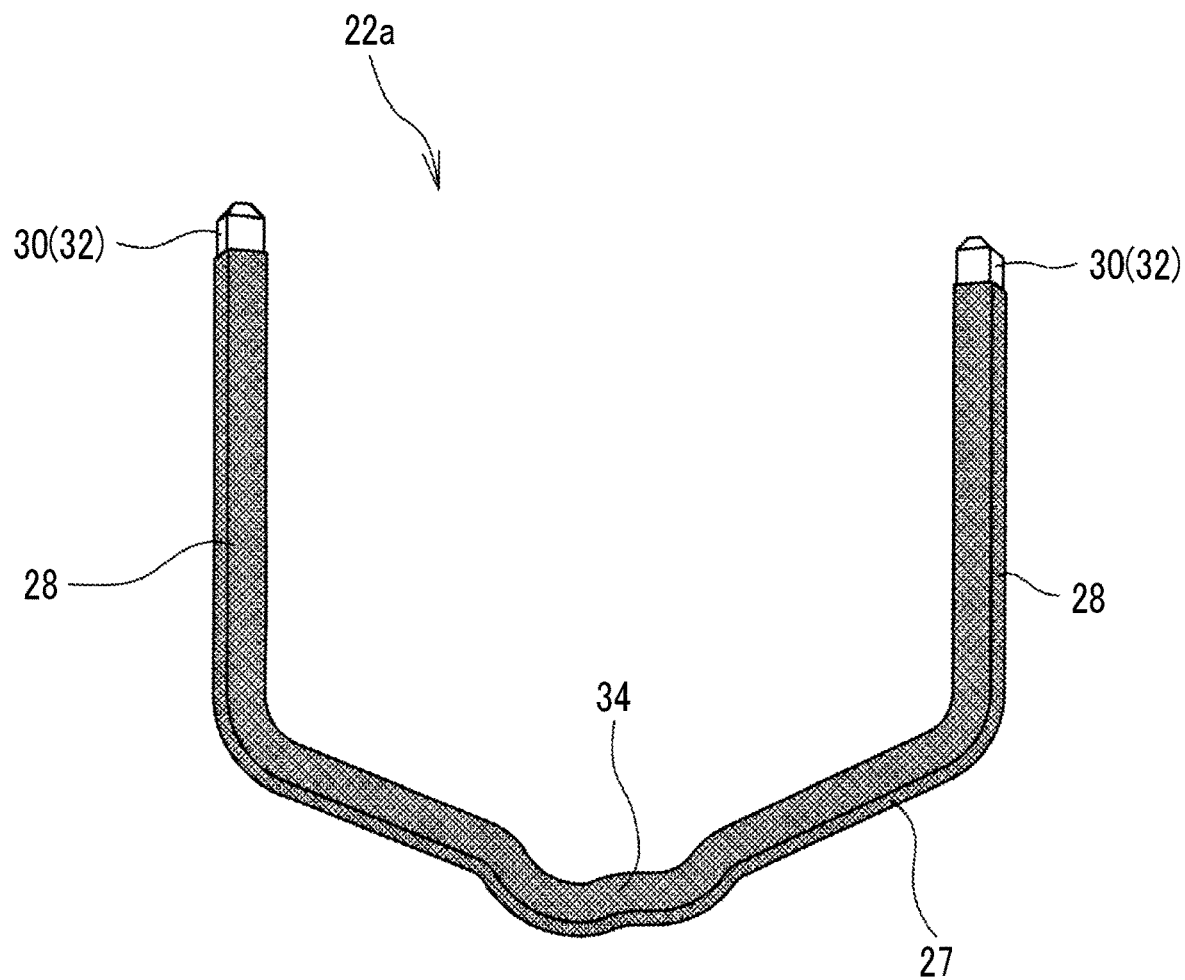
FIG. 2 is a front view of a first segment coil.

FIG. 2 is a front view of the first segment coil 22a. The first segment coil 22a is formed by covering a conducting wire 32 made of a conductive material (for example, copper or the like) with a coil film 34 (shown by black hatching) made of an insulating material. The conducting wire 32 is a rectangular wire having a rectangular cross section (in this specification, the expression "rectangular" also includes the meaning of "substantially rectangular"). The reason why the conducting wire 32 is formed of a rectangular wire in this way is for improving a space factor in the slot 18.

The first segment coil 22a is bent and formed in the same shape as that at the time of completion of the stator, that is, in the final shape. Specifically, the first segment coil 22a has a U-shape having a pair of vertical line portions 28 that is accommodated in the slots 18 and a connecting portion 27 connecting the vertical line portions 28. The length of the vertical line portion 28 is almost the same as the axial dimension of the stator core 12. For this reason, when the vertical line portion 28 is inserted into the slot 18, the end of the vertical line portion 28 is located in the vicinity of an end portion in the axial direction of the slot 18. The connecting portion 27 is provided outside the stator core 12 in the axial direction of the stator core 12, extends in the circumferential direction of the stator core 12, and configures a part of a coil end. A peeled portion 30 where the coil film 34 is peeled off such that the conducting wire 32 is exposed to the outside is formed at each of both ends of the first segment coil 22a, that is, at the end of each of the vertical line portions 28. The tip of the peeled portion 30 (the conducting wire 32) has a tapered shape that tapers off.

Figure 3:
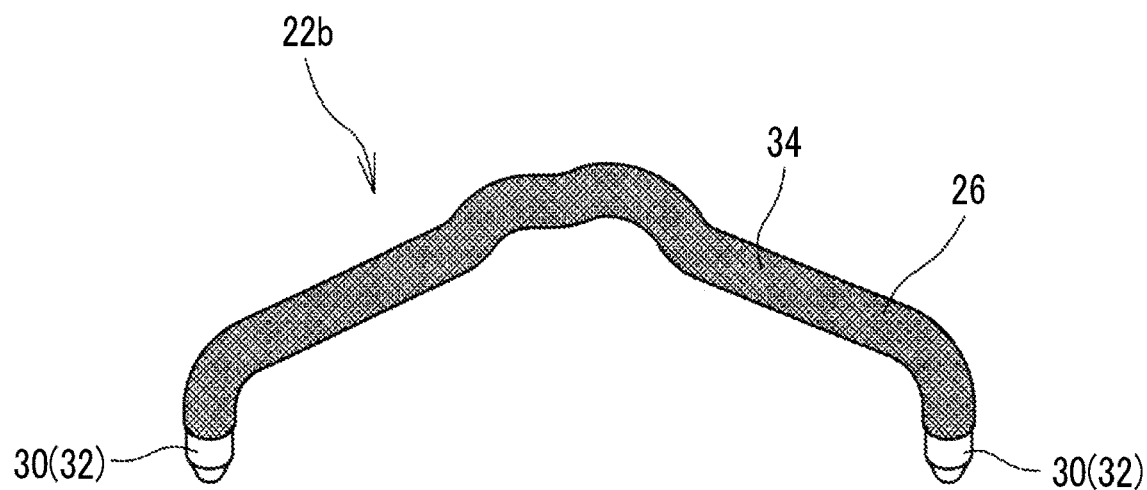
FIG. 3 is a front view of a second segment coil.

FIG. 3 is a front view of the second segment coil 22b. The second segment coil 22b is also formed by covering a conducting wire 32 made of a conductive material (for example, copper or the like) with a coil film. The second segment coil 22b is also formed in the final shape. The second segment coil 22b extends in the circumferential direction outside the stator core 12 in the axial direction on the side opposite to the connecting portion 27 to configure a part of a coil end. A peeled portion 30 where the coil film 34 is peeled off such that the conducting wire 32 is exposed to the outside is also formed at each of both ends of the second segment coil 22b. The tip of the peeled portion 30 (the conducting wire 32) also has a tapered shape that tapers off.

Here, as is apparent from FIG. 3, the conducting wire 32 that is used for the second segment coil 22b is a round wire having a circular cross section. The reason why the conducting wire 32 of the second segment coil 22b is formed of a round wire in this manner is for facilitating bending of the second segment coil 22b. That is, the second segment coil 22b needs to be bent or curved not only in the circumferential direction of the stator 10 but also in the radial direction of the stator 10, compared to the first segment coil 22a. For this reason, it is desirable that the second segment coil can be more flexibly bent than in the first segment coil 22a. A round wire is easily bent in any direction, compared to a rectangular wire, and therefore, in this example, the second segment coil 22b is formed of a round wire.

Not only the conducting wires 32 of the first and second segment coils 22a, 22b but also the coil films 34 of the first and second segment coils 22a, 22b may be different from each other. For example, in a case where the conducting wire 32 of the second segment coil 22b is a flexible round wire, damage to the coil film 34 at the time of bending can be reduced. For this reason, the coil film 34 of the second segment coil 22b may be made thinner than the coil film 34 of the first segment coil 22a.

Figure 4:
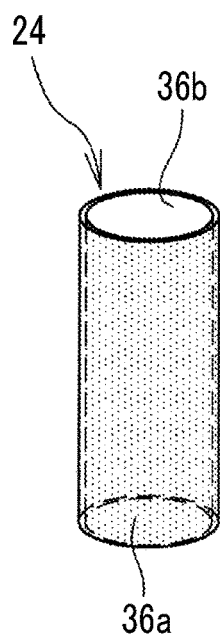
FIG. 4 is a perspective view of a connecting member.
Figure 5:
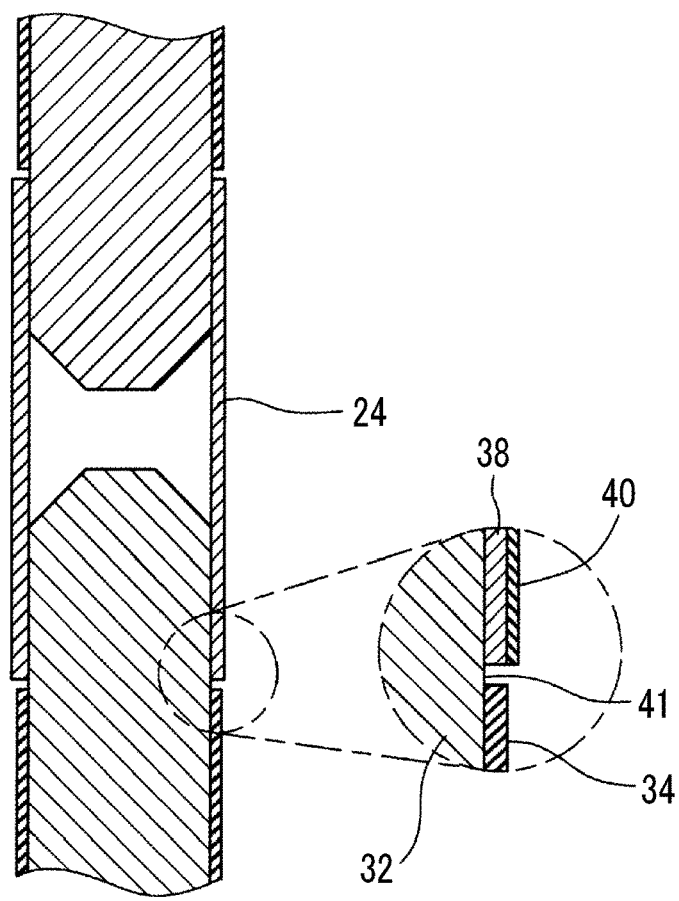
FIG. 5 is a sectional view of the periphery of the connecting member.

The first segment coil 22a and the second segment coil 22b are connected to each other by a connecting member 24. FIG. 4 is a perspective view of the connecting member 24. FIG. 5 is a schematic sectional view of the periphery of the connecting member 24. The connecting member 24 connects the two segment coils 22. The connecting member 24 has a tubular shape in which a through-hole penetrating in the axial direction thereof is formed. For this reason, the connecting member 24 has recess portions at both ends of the connecting member 24. The recess portion serves as a fitting recess portion 36 into which the end portion (the peeled portion 30) of the segment coil 22 is fitted. In the following, the recess portion into which the first segment coil 22a is fitted is referred to as a first fitting recess portion 36a, and the recess portion into which the second segment coil 22b is fitted is referred to as a second fitting recess portion 36b. In a case where it is not distinguished between the first fitting recess portion and the second fitting recess portion, it is called a "fitting recess portion 36" with the suffix alphabet omitted.

The inner peripheral length of the fitting recess portion 36 is made equal to or slightly smaller than the outer peripheral length of the segment coil 22 to be fitted into the fitting recess portion 36. Therefore, in this example, the fitting recess portion 36 is circular in cross section. However, the radius of the fitting recess portion 36 is equal to or slightly smaller than the radius of the conducting wire 32 of the second segment coil 22b. In a case where the outer peripheral length of the conducting wire 32 of the first segment coil 22a is set to be D, the radius of the fitting recess portion 36 is $D/2\pi$ or slightly smaller than $D/2\pi$. With such a configuration, it is possible to reliably and firmly fit the segment coil 22 into each fitting recess portion 36. When the conducting wire 32 (rectangular wire) of the first segment coil 22a is fitted into the first fitting recess portion 36a, the first fitting recess portion 36a is deformed into a rectangular cross-sectional shape in accordance with the shape of the conducting wire 32 to be brought into close contact with the outer surface of the conducting wire 32.

The connecting member 24 in this example includes a tubular main body 38 made of a conductive material, and an insulating film 40 covering the outer peripheral surface of the main body 38. The inner peripheral surface of the tubular main body 38 comes into close contact with the fitted segment coil 22. In other words, the main body 38 is fitted to the segment coil 22, thereby being electrically connected thereto, and functions as a part of a current path of the stator coil 20, that is, a part of the stator coil. Since the outer peripheral surface of the main body 38 is covered with the insulating film 40 in advance, insulation between the coils can be easily secured.

The main body 38 functions as a part of the current path, and therefore, when an electric current flows through the stator coil 20, the main body 38 generates heat together with the stator coil 20. The main body 38 thermally expands due to the generated heat. However, at this time, it is desirable that the main body 38 is made of a material having an expansion coefficient equal to or smaller than that of the conducting wire 32 of the segment coil 22 such that the fitting of the main body 38 and the conducting wire 32 of the segment coil 22 is not loosened. Therefore, the main body 38 may be made of the same material (for example, copper) as the conducting wire 32, for example.

As shown in FIG. 5, the first segment coil 22a is fitted to one end (the first fitting recess portion 36a) of the connecting member 24, and the second segment coil 22b is fitted to the other end (the second fitting recess portion 36b) of the connecting member 24. At this time, the first and second segment coils 22a, 22b may come into contact with each other inside the connecting member 24, or may be spaced apart from each other, as shown in FIG. 5. That is, even though the first and second segment coils 22a, 22b are spaced apart from each other, the electrical connection between the two segment coils 22 is secured by the main body 38 made of a conductive material. A gap between the first and second segment coils 22a, 22b inside the connecting member 24 may be filled with conductive paste (for example, metal paste). Such conductive paste is provided, whereby it is possible to reduce electric resistance at the connecting portion and to improve thermal conductivity.

Here, by connecting the segment coils 22 by using the connecting member 24 in this manner, the manufacturing process of the stator 10 can be further simplified compared to the related art. This will be described in comparison with the related art.

Figure 14A:
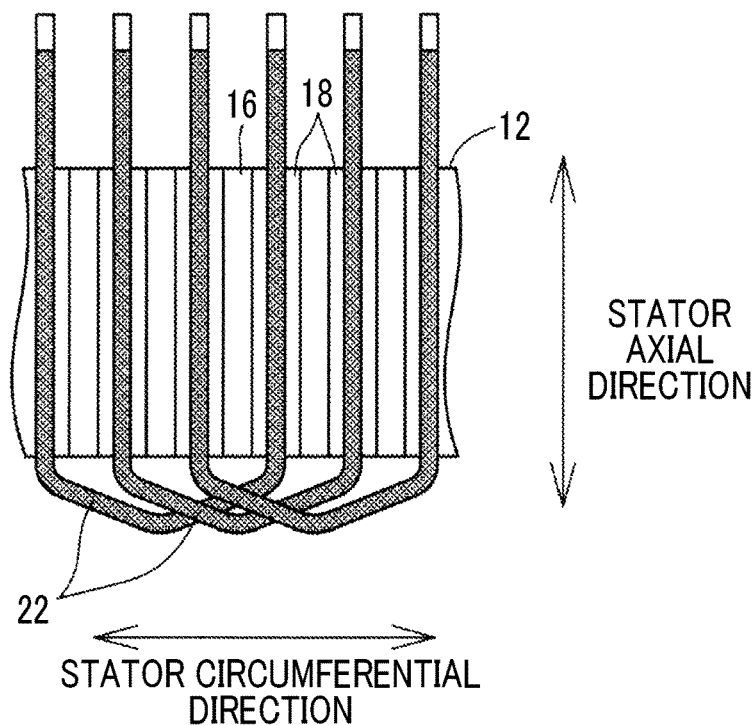
FIG. 14A is a diagram for describing a manufacturing procedure of a stator coil of the related art.
Figure 14B:
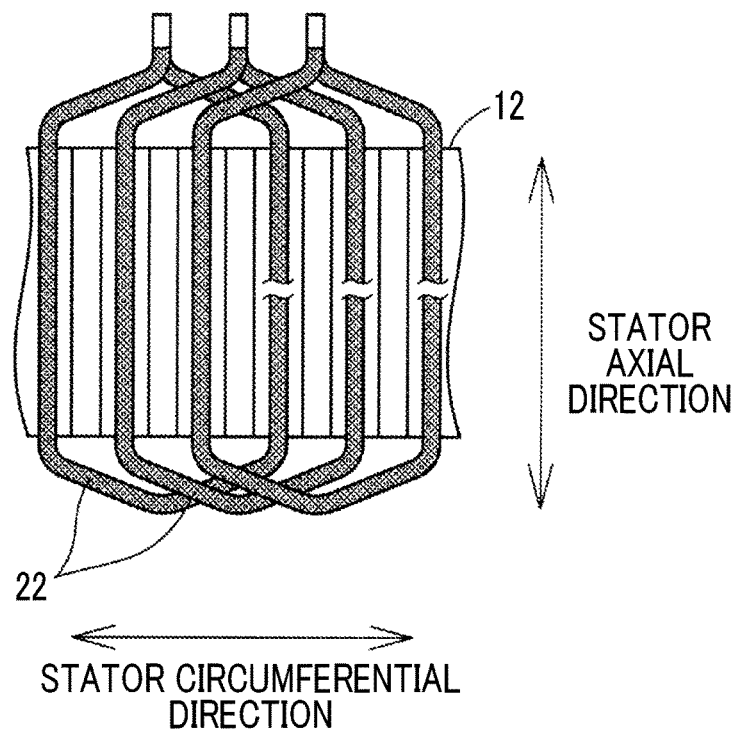
FIG. 14B is a diagram for describing a manufacturing procedure of a stator coil of the related art.

Also in the related art, a technique of forming the stator coil 20 by connecting a plurality of segment coils 22 is known. However, in the related art, after the segment coil 22 is assembled to the stator core 12, the segment coil 22 is bent and welded to another segment coil 22. FIG. 14A and FIG. 14B are diagrams showing a state of manufacturing the stator coil 20 of the related art. As shown in FIG. 14A, in the related art, first, the segment coil 22, which has a U-shape and which has the peeled portions 30 at both ends of the segment coil 22, is inserted into the slot 18. Subsequently, as shown in FIG. 14B, the segment coil 22 protruding from the end face of the stator core 12 in the axial direction of the stator core 12 is bent in the circumferential direction of the stator core 12 and then brought into contact with and welded to the end portion of the corresponding other segment coil 22 (in the illustrated example, another segment coil 22 adjacent thereto in the radial direction). Finally, insulation treatment, for example, coating of insulating paint, is performed on the peeled portion 30.

In the case of such a related art, after the segment coil 22 is assembled to the stator core 12, bending, welding, and insulation treatment of the segment coil 22 are performed. However, since there is no enough space around the segment coil 22 after it is assembled to the stator core 12, it is cumbersome to perform such processing and treatment.

Since the segment coil 22 is bent in a narrow space, the coil film 34 of the segment coil 22 is easily damaged, so that there is a case where an insulation property decreases. Welding is performed in order to connect the segment coils 22. However, there is a possibility that the coil film 34 may be damaged due to the heat during the welding. In order to restrain damage to the coil film 34, it is needed to make the coil end higher. However, this hinders downsizing of the stator 10.

Therefore, in some of the related arts, there is disclosed a technique in which the segment coil 22 is formed into a final shape in advance and the end portions of the segment coils 22 are brought into contact with each other and joined together (for example, JP 2009-194999 A or the like). In the case of this technique, since it is not needed to bend the segment coil 22 after the segment coil 22 is assembled to the stator core 12, deterioration of the coil film 34 caused by bending can be restrained. Since the bending of the segment coil 22 after the segment coil 22 is assembled to the stator core 12 is not needed, it is possible to simplify the manufacturing process to some extent. However, in the case of this technique, since the end face of one of the segment coils 22 in the axial direction of the segment coil 22 are brought into contact with the end face of another of the segment coils 22, it is needed to control the dimensional precision of the segment coil 22 in the axial direction of the segment coil 22 to a high level, and this causes complication of a manufacturing process or an increase in cost. Also in this technique, after joining the segment coils 22, insulation treatment of the peeled portion 30 is needed. In this technique, the segment coils 22 are joined to each other by pressure welding, ultrasonic joining, or caulking. However, in order to joining the segment coils 22, dedicated equipment is needed, causing an increase in equipment cost.

On the other hand, in the stator coil 20 disclosed in this specification, as described above, the segment coils 22 are connected by fitting the segment coils 22 to both ends (the fitting recess portions 36) of the connecting member 24. In the case of the fitting processing, no heat is generated, and therefore, according to this example, unlike the related art using welding or joining, the deterioration of the coil film 34 due to heat can be almost reliably restrained. In the case of this example, since it is merely needed to press-fit the conducting wire 32 of the segment coil 22 into the fitting recess portion 36 of the connecting member 24, manufacturing equipment can be simplified compared to the related art using welding, pressure welding, ultrasonic joining, or the like.

In this example, since the main body 38 of the connecting member 24 configures a part of the current path of the stator coil 20, the segment coils 22 may not be in direct contact with each other. As a result, in this example, an allowable error of the dimension of the segment coil 22 in the axial direction of the segment coil 22 can be increased compared to the related art. That is, according to this example, an error in the dimension of the segment coil 22 in the axial direction of the segment coil 22 can be absorbed by the distance between the end face of one segment coil and the end face of another segment coil inside the connecting member 24.

In this example, since the outer peripheral surface of the connecting member 24 is insulated in advance and at least a part of the peeled portion 30, e.g., almost the whole of the peeled portion 30 is covered with the connecting member 24, it is not needed to separately perform insulation treatment after the connection of the segment coils 22. However, as shown in FIG. 5, there is a possibility that a slight gap is generated between the end portion of the connecting member 24 and the end portion of the coil film 34. In such a gap, the conducting wire 32 of the segment coil 22 is exposed to the outside. In order to restrain an exposed portion 41 of the conducting wire 32 from coming close to the exposed portion 41 of another conducting wire 32, in this example, the connecting members 24 adjacent to each other in a radial direction of the segment coil is shifted from each other. That is, one of connecting members 24 and anther of connecting member which is aligned adjacent to the one of the connecting members are offset from each other in a coil axial direction of the coil.

Figure 6:
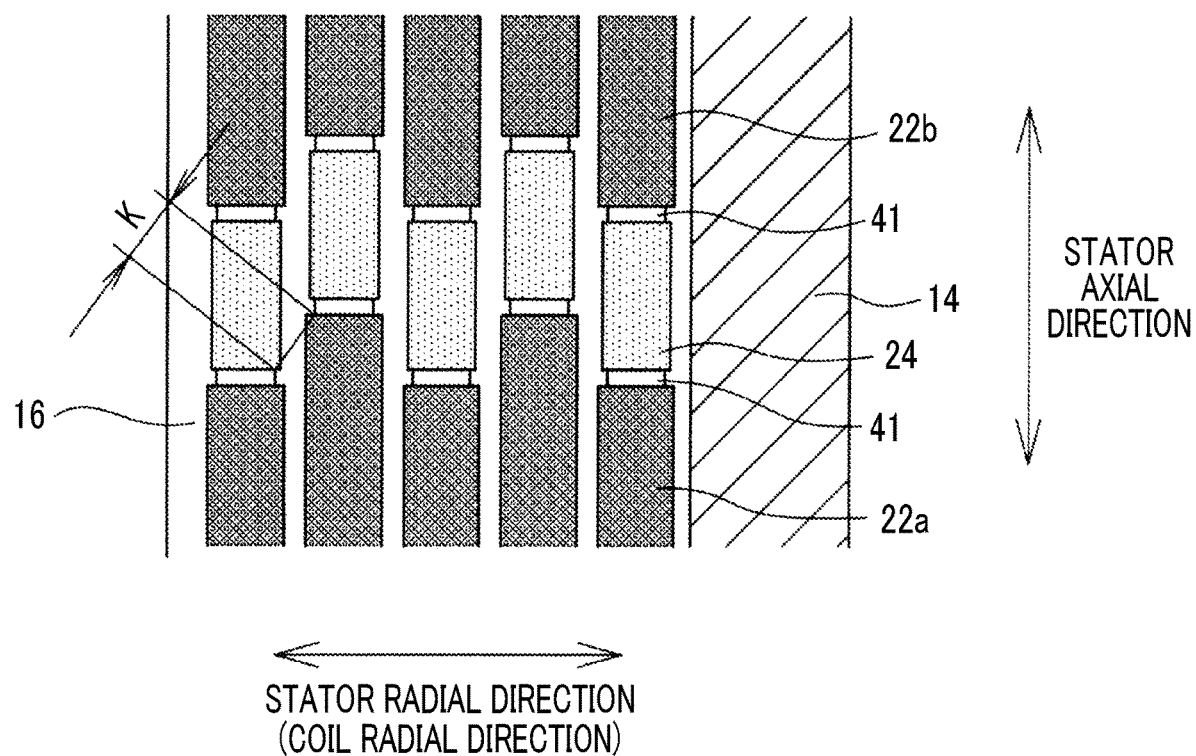
FIG. 6 is an image diagram showing a state in a slot.

This will be described with reference to FIG. 6. FIG. 6 is an image diagram in the slot 18, and in FIG. 6, a right-left direction in the plane of the drawing is a stator radial direction (a coil radial direction), and an up-down direction in the plane of the drawing is a coil axial direction. As shown in FIG. 6, in this example, the position in the coil axial direction of the connecting member 24 (the connecting portion between the segment coils 22) is shifted from another connecting member 24 adjacent thereto in the coil radial direction. With such a configuration, a distance K between the exposed portions 41 of the conducting wires 32 is increased, and thus the insulation between the coils can be secured more reliably.

Figure 7:
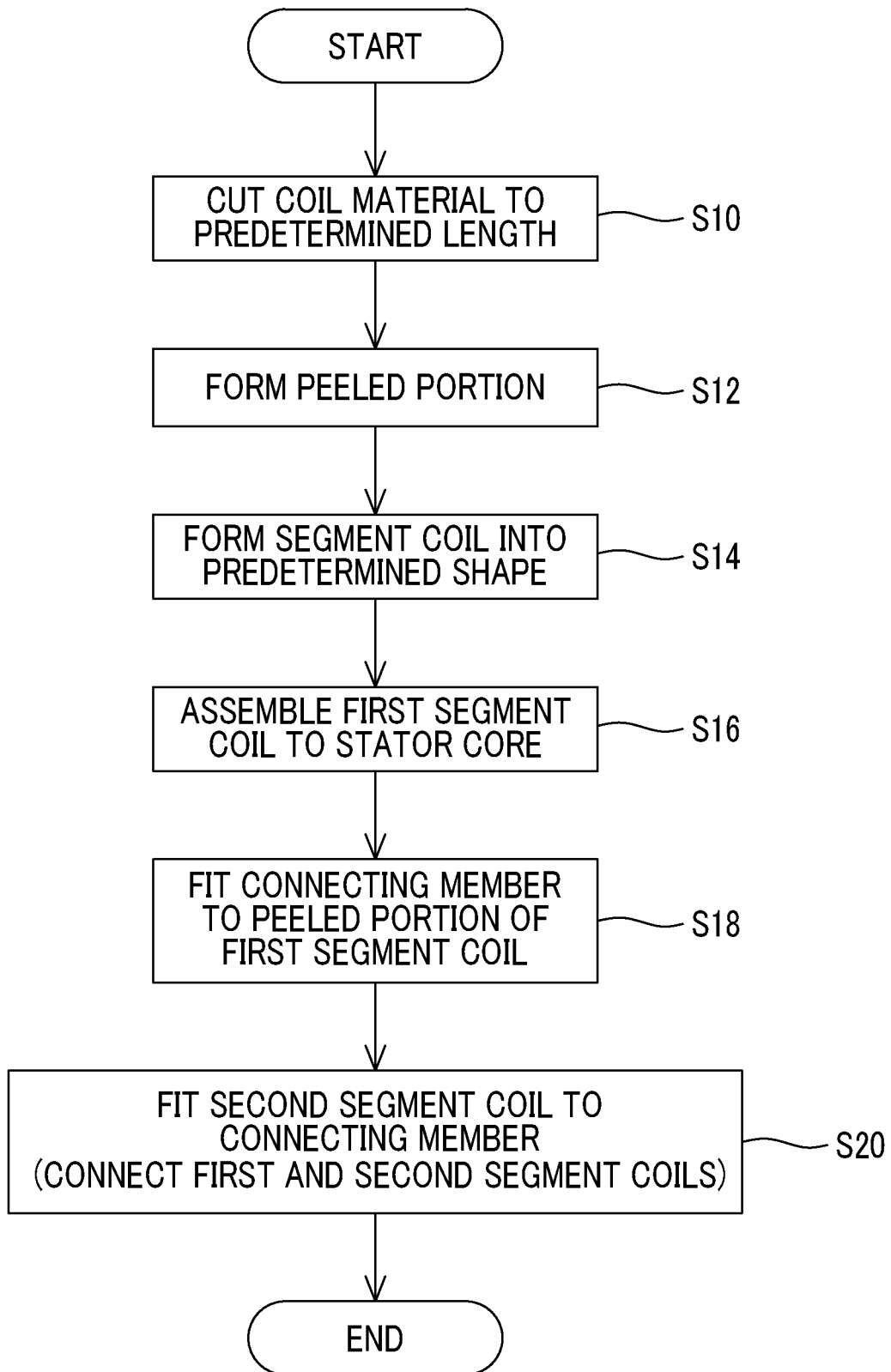
FIG. 7 is a flowchart showing a flow of manufacturing of a stator coil.

Next, a flow of manufacturing of the stator coil 20 will be described with reference to FIG. 7. FIG. 7 is a flowchart showing a flow of manufacturing of the stator coil 20. When manufacturing the stator coil 20, first, the segment coil 22 is manufactured (prepared). Specifically, a long coil material is cut to a desired length (S10). The coil material is a material of the segment coil 22 and is formed by covering a long conducting wire 32 with a coil film 34. In this example, two types of coil materials, that is, a coil material using a rectangular wire having a rectangular cross section and a coil material using a round wire having a circular cross section are prepared. Each coil material is cut by using a dedicated blade such that a desired cut shape is obtained. In this example, the coil material is cut such that the end portion of the segment coil 22 has a tapered shape that tapers off.

Subsequently, the coil film 34 is peeled off at the end portion of each segment coil 22 to form the peeled portion 30 (S12). The peeled portion 30 is formed, for example, by cutting off the coil film 34 by using a laser or the like.

Subsequently, the segment coil 22 is bent or curved to be formed into a desired shape (S14). This forming is performed, for example, by pressing the segment coil 22 against a dedicated die or by bending the segment coil 22 with a dedicated roller. In this forming, each segment coil 22 is formed into a final shape. In other words, after the segment coil is assembled to the stator core, each segment coil 22 is not subjected to bending. Therefore, in this example, the first segment coil 22*a* is formed in a U-shape, and the second segment coil 22*b* is formed in a chevron shape.

When the segment coil 22 can be formed into a desired shape, the U-shaped first segment coil 22*a* is assembled to the stator core 12 (S16). That is, the vertical line portion 28 of the first segment coil 22*a* is inserted into the slot 18. The first segment coil 22*a* assembled to the stator core 12 is held by a dedicated jig so as to maintain the assembled state thereof.

When the first segment coils 22*a* can be assembled to the core, subsequently, the connecting member 24 is fitted to the peeled portion 30 of the first segment coil 22*a* (S18). That is, the peeled portion 30 of the first segment coil 22*a* is press-fitted into the first fitting recess portion 36a. At this time, since the tip of the peeled portion 30 has a tapered shape that tapers off, the peeled portion 30 can be easily guided into the first fitting recess portion 36a, and thus the peeled portion 30 and the first fitting recess portion 36a can easily be connected to each other. In this way, the connecting member 24 is also assembled to the stator core 12.

Finally, the peeled portion 30 of the second segment coil 22b is press-fitted into the second fitting recess portion 36b of the connecting member 24 assembled to the core (S20). Since the tip of the peeled portion 30 of the second segment coil 22b also has a tapered shape that tapers off, the peeled portion 30 can be easily guided into the second fitting recess portion 36b, and thus the peeled portion 30 and the second fitting recess portion 36b can easily be connected to each other. In this way, the first segment coil 22a and the second segment coil 22b are mechanically and electrically connected by the connecting member 24. Such connection is performed in all the first and second segment coils 22a, 22b, whereby the stator coil 20 is completed.

As is apparent from the above description, according to this example, since the segment coils 22 are connected to each other with simple processing such as fitting, an equipment cost can be reduced compared to the related art using welding or pressure welding. In the case of the fitting, no heat is generated, and therefore, the deterioration of the coil film 34 can be more reliably restrained. Since the connecting member 24 covered with the insulating film 40 in advance is used, the insulation treatment after the segment coils 22 are connected each other is not needed, and thus the manufacturing process can be further simplified. Since bending of the segment coil 22 after the segment coil 22 is assembled to the stator core is not needed, the manufacturing process can be simplified and the deterioration of the coil film 34 can be restrained.

The manufacturing procedure described above is merely an example, and as long as at least the first and second segment coils 22a, 22b are fitted into the fitting recess portions 36 of the connecting member 24 so as to connect both the coils, the manufacturing procedure may be appropriately changed. Therefore, for example, step S18 and step S20 may be reversed. That is, after the connecting member 24 is fitted to the second segment coil 22b, the first segment coil 22a may be fitted to the connecting member 24. Before the first segment coil 22a is assembled to the core, the connecting member 24 may be fitted to the first segment coil 22a. That is, step S16 and step S18 may be reversed. However, in a case where the connecting member 24 is fitted to the first segment coil 22a before the first segment coil 22a is assembled to the core, there is a possibility that the first segment coil 22a may be locally thickened due to an axial compression force that is generated when the connecting member 24 is fitted to the first segment coil 22a. When the first segment coil 22a is locally thickened, the space factor in the slot 18 decreases. Therefore, it is desirable that the first segment coil 22a is fitted to the connecting member 24 after the first segment coil 22a is assembled to the core.

Figure 8:
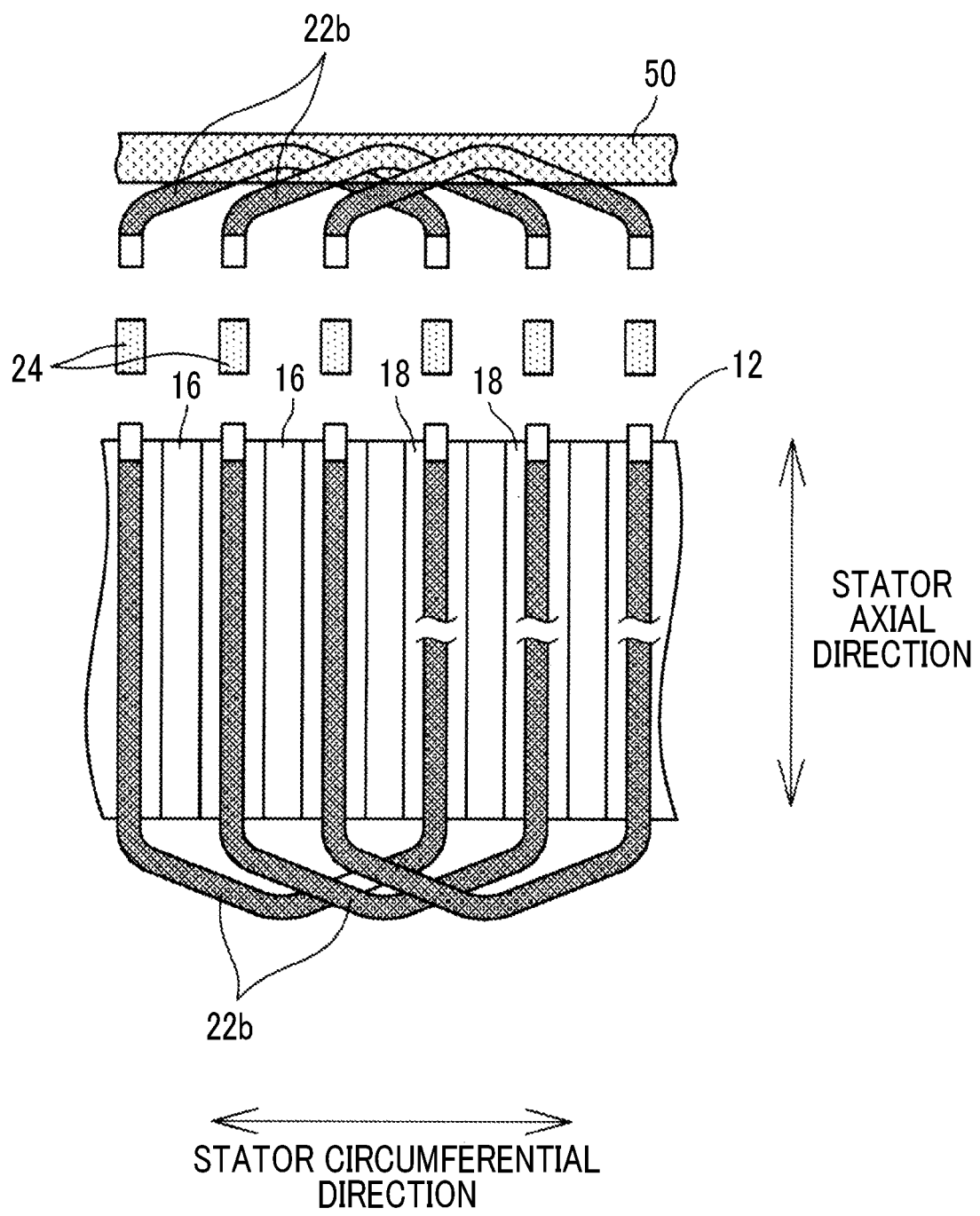
FIG. 8 is an image diagram showing a connection state of the second segment coil.

A plurality of second segment coils 22b may be connected to the corresponding first segment coils 22a at once. This will be described with reference to FIG. 8. FIG. 8 is a schematic diagram of the stator core as viewed from the inside of the stator core in the radial direction of the stator core. In FIG. 8, a right-left direction in the plane of the drawing is a stator circumferential direction, and an up-down direction in the plane of the drawing is a stator axial direction. As shown in FIG. 8, the second segment coils 22b may be connected and integrated by a resin mold 50. Then, the integrated part (the second segment coils 22b) may be fitted to a plurality of connecting members at once. With such a configuration, the work of connecting the segment coils 22 can be further simplified. In this case, the resin mold 50 connecting the second segment coils 22b remains at one end of the stator coil 20 in the axial direction of the stator coil 20.

Figure 9:
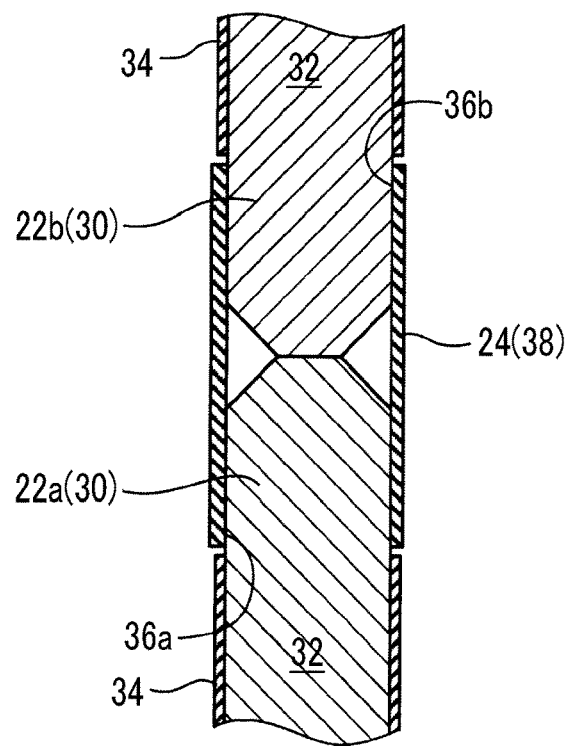
FIG. 9 is a diagram showing an example of another connecting member.

In the above description, the main body 38 of the connecting member 24 is made of a conductive material. However, the main body 38 of the connecting member 24 may be made of an insulating material. Therefore, for example, the main body 38 of the connecting member 24 may be a tubular body made of an insulating material. FIG. 9 is a diagram showing an example in which the main body 38 is made of an insulating material. In this case, the first segment coil 22a and the second segment coil 22b may be brought into contact with each other inside the connecting member 24 to secure a current path. In this case, it is desirable that the connecting member 24 is made of an insulating material (for example, glass or ceramics) having a coefficient of thermal expansion equal to or smaller than that of the conducting wire 32 of the segment coil 22.

Figure 10:
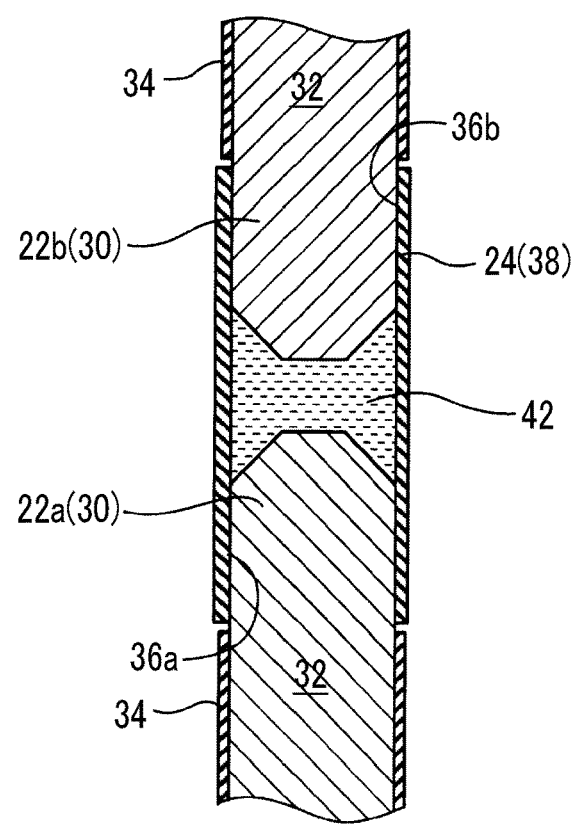
FIG. 10 is a diagram showing an example of another connecting member.
Figure 11:
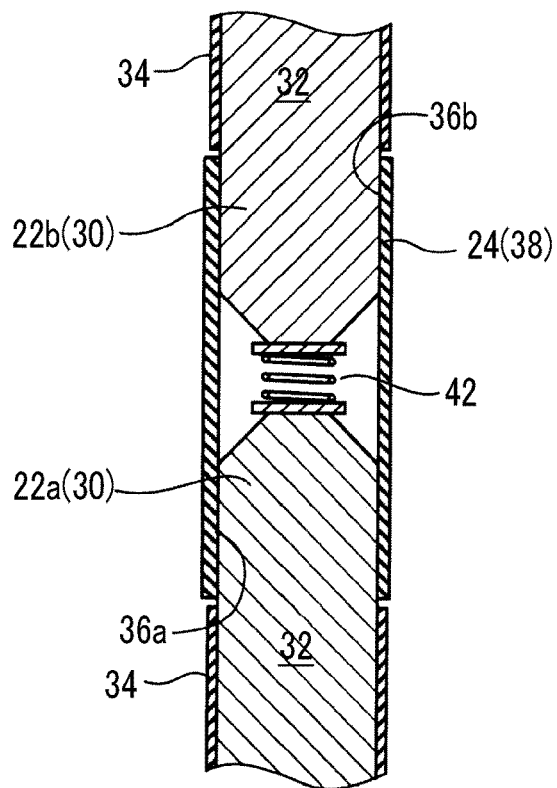
FIG. 11 is a diagram showing an example of another connecting member.

In a case where the main body 38 of the connecting member 24 is made of an insulating material, an electric conductor that comes into contact with the first and second segment coils 22a, 22b may be provided inside the main body 38. Such an electric conductor is not particularly limited as long as it has conductivity. However, it is desirable that the electric conductor has elasticity or fluidity and the dimension of the electric conductor in the coil axial direction can be changed. That is, the electric conductor is flexible in the coil axial direction. Therefore, for example, an electric conductor 42 may be conductive paste (for example, metal paste) that is sintered after being filled between the first and second segment coils 22a, 22b, as shown in FIG. 10. In this case, the conductive paste (the electric conductor 42) comes into contact with the entirety of the tip surfaces (including the tapered surfaces) of the first and second segment coils 22a, 22b. Then, in this case, the contact area between the electric conductor 42 and each of the segment coils 22a, 22b becomes sufficiently large, and thus the electric resistance decreases and the thermal conductivity is improved. As another form, the electric conductor 42 may include a spring that can expand and contract in the coil axial direction, as shown in FIG. 11. In any case, the electric conductor 42 deformable in the coil axial direction is provided inside the insulating main body 38, whereby an error in the dimension in the coil axial direction of the segment coil 22 can be absorbed.

Figure 12:
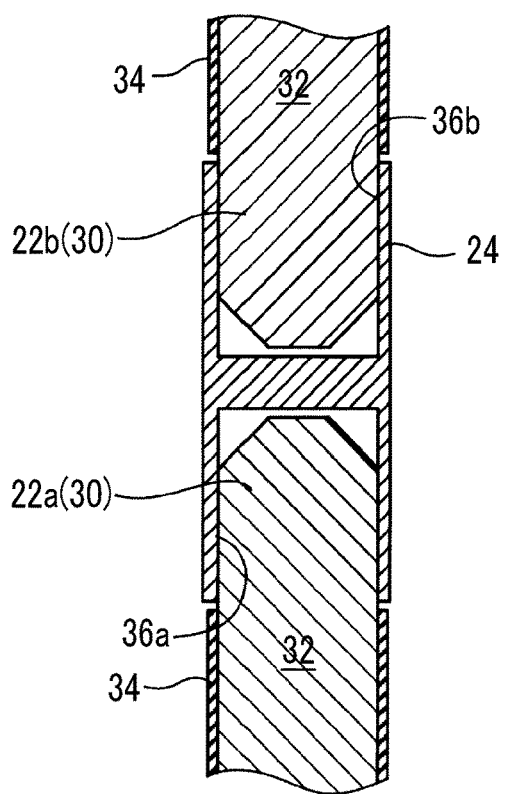
FIG. 12 is a diagram showing an example of another connecting member.

In the above description, the connecting member 24 is a tubular body having a through-hole formed therein. However, the connecting member 24 may not be a tubular body as long as the fitting recess portions 36 are formed at both ends thereof. For example, as shown in FIG. 12, the connecting member 24 may be a non-tubular body in which holes (recess portions) are formed in the end faces in the axial direction of the connecting member. In other words, the first fitting recess portion 36a and the second fitting recess portion 36b may not communicate with each other. In this case, the first fitting recess portion 36a and the second fitting recess portion 36b may have shapes different from each other. Therefore, for example, the first fitting recess portion 36a may have a rectangular shape matching the conducting wire 32 of the first segment coil 22a, and the second fitting recess portion 36b may have a circular shape (in this specification, the expression "circular" also includes the meaning of "substantially circular") matching the conducting wire 32 of the second segment coil 22*b*.

Figure 13A:
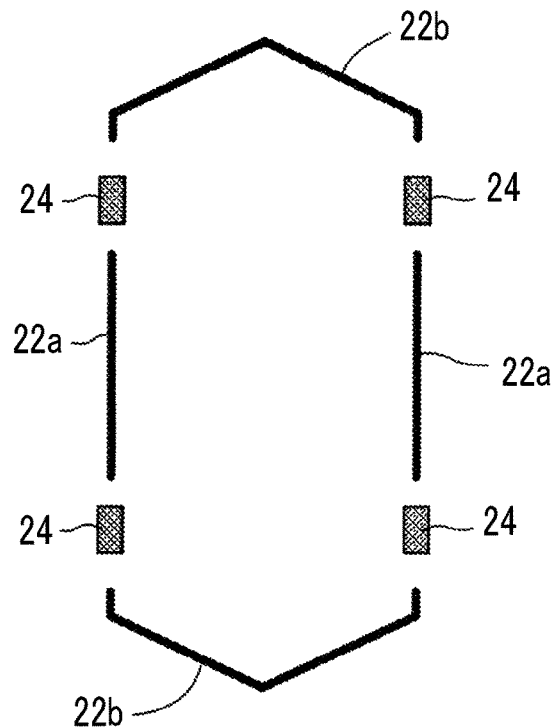
FIG. 13A is a diagram showing an example of a shape of a segment coil.

In the above description, the first segment coil 22*a* has a U-shape and the second segment coil 22*b* has a chevron shape. However, the shapes of the segment coils 22 may be appropriately changed. FIG. 13A to FIG. 13D are diagrams showing variations of the shape of the segment coil 22. As shown in FIG. 13A, a configuration is also acceptable in which the first segment coil 22*a* is formed in a straight line shape having solely a portion to be accommodated in the slot 18 and the second segment coil 22*b* having a chevron shape is connected to each of both sides of the first segment coil 22*a*. In the case of such a configuration, the portion of the stator coil 20, which is accommodated in the slot, can be formed of a rectangular wire, and the portion to become the coil end can be formed of a round wire. As a result, the coil end portion can be easily formed (bent) while improving the space factor in the slot 18.

Figure 13B:
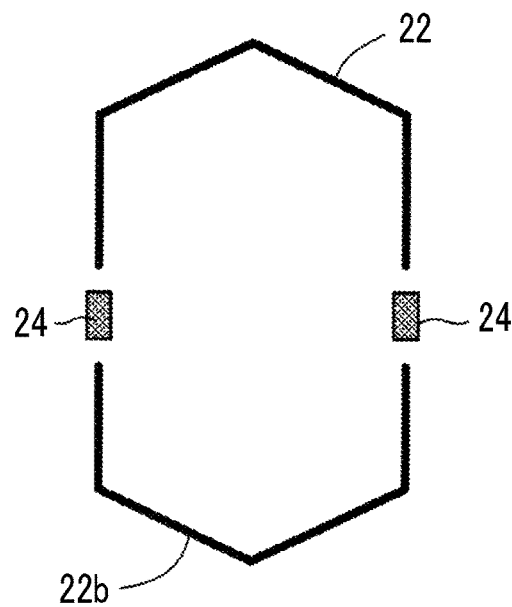
FIG. 13B is a diagram showing an example of a shape of a segment coil.
Figure 13C:
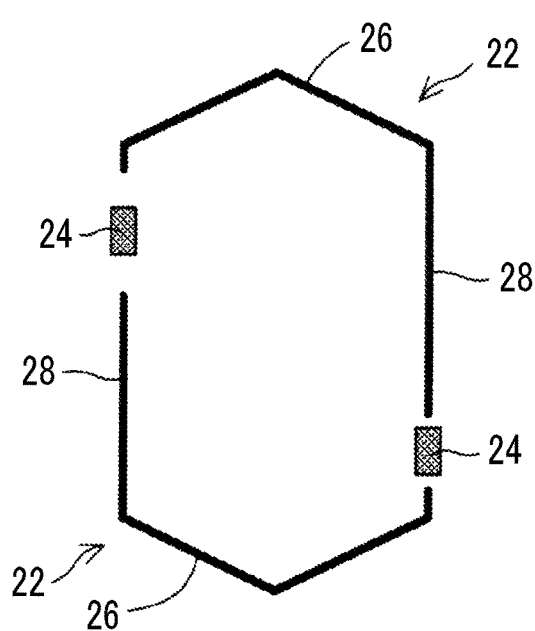
FIG. 13C is a diagram showing an example of a shape of a segment coil.

As another form, as shown in FIG. 13B, all of the segment coils 22 may be formed in a U-shape. In the case of such a configuration, each segment coil 22 is fitted to the connecting member 24 within the slot 18. In this case, in order to facilitate the fitting work, it is desirable that the stator core 12 is a split core divided into two parts in the axial direction. As another form, as shown in FIG. 13C, the segment coil 22 may be formed in a J-shape (in this specification, the expression "J-shape" also includes the meaning of a "substantially J-shape") in which the vertical line portion 28 to be accommodated in the slot 18 is connected to one end of a chevron-shaped transverse line portion 26 serving as a coil end.

All the segment coils 22 described above are connected inside the slot 18 or in the vicinity of the end portion of the slot 18 in the axial direction of the slot 18. In other words, the portion corresponding to the coil end, of the segment coil 22, extends outside the stator core 12 in the axial direction without interruption in the middle from one slot 18 to the other slot 18. With such a configuration, the height of the coil end can be reduced, and thus the stator 10 can be downsized.

Figure 13D:
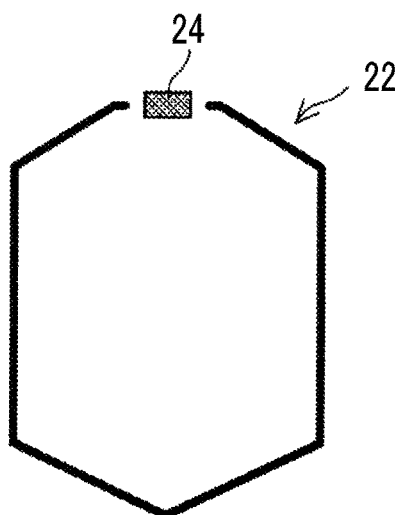
FIG. 13D is a diagram showing an example of a shape of a segment coil.

However, in some cases, as shown in FIG. 13D, the connection between the segment coils 22 may be performed in the middle of the coil end. In the case of such a configuration, the hollow connecting member 24 is present in the middle of the coil end, and thus the heat radiation property of the coil end is improved.

In the above description, the shape of the conducting wire 32 of the first segment coil 22*a* is different from the shape of the conducting wire 32 of the first segment coil 22*b*. However, the shapes of the conducting wires of both the coils 22*a*, 22*b* may be the same. By making the shapes of the conducting wires the same, a coil material can be used in common, and thus a material cost can be reduced. In this example, a taper for guiding the fitting recess portion 36 is provided at the tip of the segment coil 22 (the peeled portion 30). However, instead of or in addition to the segment coil 22, a taper for guiding the segment coil 22 may be provided at the fitting recess portion 36.

What is claimed is:

1. A stator of a rotary electric machine, the stator comprising:
    a stator core; and
    a stator coil that is wound around the stator core,
    wherein the stator coil includes
        a first segment coil,
        a second segment coil, and
        a first connecting member that has a first fitting recess portion at a first end of the first connecting member and a second fitting recess portion at a second end of the first connecting member, the first connecting member connecting the first segment coil and the second segment coil by fitting the first segment coil into the first fitting recess portion and by fitting the second segment coil into the second fitting recess portion,
    wherein the first segment coil and the second segment coil have cross-sectional shapes different from each other,
    wherein the first and second fitting recess portions of the connecting member have shapes different from each other, and
    wherein the first segment coil and the second segment coil each have a single conductor.

2. The stator according to claim 1, wherein:
    the first connecting member includes
        a main body that is made of a conductive material and to which the first and second segment coils are fitted, and
        an insulating film covering an outer surface of the main body; and
    the main body configures a part of a current path of the stator coil.

3. The stator according to claim 1, wherein:
    the first connecting member includes a tubular main body that is made of an insulating material and to which the first and second segment coil are fitted; and
    the first and second segment coils are electrically connected to each other by being in contact with each other inside the main body or through an electric conductor accommodated in the main body.

4. The stator according to claim 3, wherein:
    the first and second segment coils are electrically connected to each other through an electric conductor inside the main body;
    the electric conductor has elasticity or fluidity; and
    the electric conductor is flexible in an axial direction of the electric conductor.

5. The stator according to claim 1, wherein:
    the first segment coil has a first peeled portion where a first coil film is peeled off at an end portion of the first segment coil;
    the second segment coil has a second peeled portion where a second coil film is peeled off at an end portion of the second segment coil; and
    at least a part of the first peeled portion is accommodated in the first fitting recess portion, and at least a part of the second peeled portion is accommodated in the second fitting recess portion.

6. The stator according to any one of claim 5, wherein
    a whole of the first peeled portion is accommodated in the first fitting recess portion;
    a whole of the second peeled portion is accommodated in the second fitting recess portion.

7. The stator according to claim 1, wherein
    at least one of an end portion of the first segment coil and the first fitting recess portion is provided with a taper for guiding the other of the end portion of the first segment coil and the first fitting recess portion; and
    at least one of an end portion of the second segment coil and the second fitting recess portion is provided with a taper for guiding the other of the end portion of the second segment coil and the second fitting recess portion.

8. The stator according to claim 1, wherein the first connecting member and a second connecting member aligned adjacent to the first connecting member in a radial direction of the first segment coil are offset from each other in an axial direction of the first segment coil.

9. The stator according to claim 1, wherein:
the first segment coil has a vertical line portion that is accommodated in a slot of the stator core is fitted into the first fitting recess portion of the first connecting member;
the second segment coil is provided outside the stator core in an axial direction of the stator core, extends in a circumferential direction of the stator core, and configures a coil end, and the second segment coil is fitted into the second fitting recess portion of the first connecting member; and
the first segment coil and the second segment coil are connected through the first connecting member in a vicinity of an end portion in an axial direction of the slot.

10. A method of manufacturing a stator coil that is wound around a stator core, the method comprising:
preparing a first segment coil, a second segment coil, and a connecting member having a first fitting recess portion at a first end of the connecting member and a second fitting recess portion at a second end of the connecting member to form the stator coil; and
connecting the first segment coil and the second segment coil by fitting the first segment coil into the first fitting recess portion and by fitting the second segment coil into the second fitting recess portion,
wherein the first segment coil and the second segment coil have cross-sectional shapes different from each other,
wherein the first and second fitting recess portions of the connecting member have shapes different from each other and,
wherein the first segment coil and the second segment coil each have a single conductor.

11. The method according to claim 10, wherein an outer peripheral surface of the connecting member is subjected to insulation treatment before connecting the first segment coil and the second segment coil.

12. The method according to claim 10, wherein, after the first segment coil formed in a final shape is assembled to the stator core, the second segment coil formed in a final shape is connected to the first segment coil by the connecting member.

13. The method according to claim 12, wherein:
the first segment coil has a vertical line portion that is accommodated in a slot of the stator core;
the second segment coil is provided outside the stator core in an axial direction of the stator core, extends in a circumferential direction of the stator core, and forms a coil end; and
after a plurality of first segment coils is assembled to the stator core, a plurality of second segment coils integrated with resin is connected to the plurality of the first segment coils through a plurality of the connecting members at once.

14. The method according to claim 12, wherein the first segment coil is fitted to the connecting member after the first segment coil is assembled to the stator core.

* * * * *